United States Patent
Koyanagi et al.

(10) Patent No.: US 7,501,021 B2
(45) Date of Patent: Mar. 10, 2009

(54) RHEOLOGY MODIFIER

(75) Inventors: Koji Koyanagi, Wakayama (JP); Fujio Yamato, Wakayama (JP); Toshiharu Kojima, Wakayama (JP); Hotaka Yamamuro, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 11/806,498

(22) Filed: May 31, 2007

(65) Prior Publication Data
US 2007/0290160 A1 Dec. 20, 2007

(30) Foreign Application Priority Data
Jun. 1, 2006 (JP) .............................. 2006-153175

(51) Int. Cl.
*C04B 18/06* (2006.01)

(52) U.S. Cl. .................... 106/708; 106/608; 106/719; 252/1

(58) Field of Classification Search ........... 507/204, 507/240; 252/1; 106/608, 708, 719
See application file for complete search history.

(56) References Cited

U.S. PATENT DOCUMENTS

| | | | | | |
|---|---|---|---|---|---|
| 4,772,424 | A | * | 9/1988 | Greeb | 510/125 |
| 4,842,771 | A | * | 6/1989 | Rorig et al. | 510/181 |
| 5,674,316 | A | * | 10/1997 | Izumi et al. | 106/724 |
| 5,720,807 | A | * | 2/1998 | Izumi et al. | 106/696 |
| 7,261,771 | B2 | * | 8/2007 | Schlenoff | 106/696 |
| 2007/0167332 | A1 | * | 7/2007 | Subramanian et al. | 507/240 |

FOREIGN PATENT DOCUMENTS

| EP | 1286929 B1 | * 12/2005 |
|---|---|---|
| JP | 2003-313536 A | 11/2003 |
| JP | 2004-189978 A | 7/2004 |

* cited by examiner

*Primary Examiner*—Douglas Mc Ginty
*Assistant Examiner*—Haidung D. Nguyen
(74) *Attorney, Agent, or Firm*—Birch, Stewart, Kolasch & Birch, LLP

(57) ABSTRACT

Disclosed is a powdery rheology modifier containing an anionic aromatic compound, a cationic surfactant, and an inorganic powder having a specific surface area of 5000 $cm^2/g$ or more.

9 Claims, No Drawings

RHEOLOGY MODIFIER

FIELD OF THE INVENTION

The present invention relates to a powdery rheology modifier.

BACKGROUND OF THE INVENTION

For regulating the Theological physical properties (for example viscosity) of slurry composed of water and powder, there have been used techniques of controlling the amount of excess water by regulating the ratio of water to powder, by changing a dispersed state of particles with a pH regulating agent, or by adding a water-absorbing polymer, or techniques that involve adding a water-soluble polymer compound to a slurry system to utilize a thickening action attributable to entanglement of polymer molecules.

A slurry rheology modifier showing sufficient viscosity upon kneading for a short time in producing slurry, having stable resistance to material separation, exhibiting stable properties and composition even in the case of a high water/powder ratio or in contact with an aqueous phase, and being aimed at obtaining slurry excellent in hardening physical properties without setting retardation of hydraulic powder, has been proposed (JP-A 2003-313536). It has also been proposed that a slurry rheology modifier simultaneously using two kinds of water-soluble low-molecular-weight compounds is used as a kit (JP-A 2004-189978).

SUMMARY OF THE INVENTION

The present invention relates to a powdery rheology modifier containing an anionic aromatic compound, a cationic surfactant, and an inorganic powder having a specific surface area of 5000 $cm^2/g$ or more.

The present invention also relates to a rheology modifier kit including (A) a powdery composition containing an anionic aromatic compound and (B) a powdery composition containing a cationic surfactant and an inorganic powder having a specific surface area of 5000 $cm^2/g$ or more.

The present invention also relates to a hydraulic composition, containing the above shown powdery rheology modifier in a hydraulic powder-containing slurry. The invention composition can be obtained by incorporating the above shown powdery rheology modifier into a hydraulic powder-containing slurry.

The present invention also relates to use of a powdery composition containing an anionic aromatic compound, a cationic surfactant and an inorganic powder having a specific surface area of 5000 $cm^2/g$ or more as a rheology modifier.

The present invention also relates to a process for producing a powdery rheology modifier, including mixing an inorganic powder having a specific surface area of 5000 $cm^2/g$ or more, an anionic aromatic compound, and a cationic surfactant, wherein at least one of the anionic aromatic compound and the cationic surfactant is mixed in liquid form.

DETAILED DESCRIPTION OF THE INVENTION

If the rheology modifier as shown in JP-A 2003-313536 and JP-A 2004-189978 could be powdered as a compounding ingredient for use in a previously prepared mortar material (hereinafter referred to as dry blend) composed of a hydraulic material, aggregate, fine particles etc., the rheology modifier would be preferable in respect of convenience and the like at the time of preparing a hydraulic composition. Even in JP-A 2003-313536 and JP-A 2004-189978, it is noted that two kinds of compounds are used in powdery form, but as a specific technique, only powderization by lyophilization is disclosed in JP-A 2004-189978. However, further improvement in respect of productivity is desired.

Spray drying by heating, drum drying, etc. are sometimes used for powderization of a water-containing surfactant, but heating is not preferable for some of the compounds used in JP-A 2003-313536 and JP-A 2004-189978, and such techniques may be hardly applicable.

The present invention provides a highly productive powdery rheology modifier excellent in handling ability.

According to the present invention, there is provided a highly productive powdery rheology modifier excellent in handling ability.

The anionic aromatic compound and the cationic surfactant used in the powdery rheology modifier of the present invention form an aggregate structure such as string-shaped micelle in a composition as the object of the rheology modifier to exhibit a rheology modification effect by the structure.

The combination of the anionic aromatic compound and the cationic surfactant may be any combination that forms an aggregate structure such as string-shaped micelle, and preferably has a property that, when an aqueous anionic aromatic compound solution having a viscosity of 100 mPa·s or less is mixed with an aqueous cationic surfactant solution having a viscosity of 100 mPa·s or less, the viscosity of the resulting mixture can be made at least twice as high as the viscosity of either aqueous solution before mixing. The combination has a property that the viscosity can be made more preferably at least 5 times, even more preferably at least 10 times, further more preferably at least 100 times and even more preferably at least 500 times. The viscosity refers to viscosity determined by a Brookfield viscometer under the condition of 20° C. (with rotor C [or rotor No. 3 when expressed in number] at 1.5 rpm to 12 rpm). In this case, the viscosity behavior may be exhibited by any number of revolutions of 1.5 rpm to 12 rpm. The aqueous solutions are mixed in the 50/50 ratio by weight. Both the concentration of the anionic aromatic compound in aqueous solution and the concentration of the cationic surfactant in aqueous solution are preferably 0.01 to 50% by weight.

The anionic aromatic compound used in the powdery rheology modifier of the present invention includes a carboxylic acid having an aromatic ring and salts thereof, phosphonic acid and salts thereof, and sulfonic acid and salts thereof, and specific examples include salicylic acid, p-toluenesulfonic acid, sulfosalicylic acid, benzoic acid, m-sulfobenzoic acid, p-sulfobenzoic acid, 4-sulfophthalic acid, 5-sulfoisophthalic acid, p-phenolsulfonic acid, m-xylene-4-sulfonic acid, cumenesulfonic acid, methylsalicylic acid, styrenesulfonic acid and chlorobenzoic acid, and these may form salts, and these may be used as a mixture of two or more thereof. When the anionic aromatic compound is a polymer, however, its weight-average molecular weight (for example, polyethylene oxide-equivalent molecular weight by gel permeation chromatography) is preferably less than 500.

From the viewpoint of obtaining a powdery rheology modifier, the anionic aromatic compound used is preferably in powdery form by itself.

The cationic surfactant used in the powdery rheology modifier of the present invention is preferably a cationic surfactant in the form of a quaternary salt, and the cationic surfactant in the form of a quaternary salt preferably has, in its structure, at least one saturated or unsaturated linear or branched alkyl group having 10 to 26 carbon atoms. Examples include an alkyl (C10 to C26) trimethyl ammonium salt, an alkyl (C10 to C26) pyridinium salt, an alkyl (C10 to C26) imidazolinium salt, and an alkyl (C10 to C26) dimethylbenzyl ammonium salt, and specific examples include hexadecyltrimethyl ammonium chloride, hexadecyltrimethyl ammonium bromide, octadecyltrimethyl ammonium chloride, octadecyltrimethyl ammonium bromide, tallow trimethyl ammonium chloride, tallow trimethyl ammonium bromide, hydrogenated tallow trimethyl ammonium chloride, hydrogenated tallow trimethyl ammonium bromide, hexadecylethyldimethyl ammonium chloride, octadecylethyldimethyl ammonium chloride, hexadecylpropyldimethyl ammonium chloride, hexadecyl pyridinium chloride, 1,1-dimethyl-2-hexadecyl imidazolinium chloride, hexadecyldimethyl benzyl ammonium chloride etc., and two or more of these compounds may be simultaneously used. From the viewpoint of water solubility and thickening effect, specifically hexadecyltrimethyl ammonium chloride, octadecyltrimethyl ammonium chloride, hexadecyl pyridinium chloride etc. are preferable. From the viewpoint of the temperature stability of the thickening effect, two or more kinds of cat ionic surfactants different in the number of carbon atoms in the alkyl group are preferably used as the cationic surfactant.

From the viewpoint of obtaining the powdery rheology modifier, it is preferable that the cationic surfactant in the form of a solution is used after being mixed with, and supported on, an inorganic powder described later.

The inorganic powder used in the present invention contains (supports) the liquid anionic aromatic compound or the liquid cationic surfactant thereby converting it into powder.

As the specific surface area of the inorganic powder used in the present invention is increased, the capacity for the inorganic powder to contain the anionic aromatic compound or the cationic surfactant is increased. The specific surface area may be determined depending on the type and amount of the anionic aromatic compound or the cationic surfactant, but from the viewpoint of incorporation and powderization of the anionic aromatic compound or the cationic surfactant, the specific surface area is specifically preferably 5000 cm$^2$/g or more, more preferably 10000 cm$^2$/g or more, even more preferably 20000 cm$^2$/g or more. In the present invention, the specific surface area is determined by BET surface area measurement by a nitrogen adsorption method (Micromeritics Flowsorb 2300 manufactured by Shimadzu Corporation)

From the viewpoint of the particle diameter of the inorganic powder, the specific surface area is preferably 1500000 cm$^2$/g or less, more preferably 500000 cm$^2$/g or less.

The inorganic powder includes powder such as blast-furnace slag, calcium silicate, calcium carbonate and silica fume. Silica fume is more preferable because it has a large specific surface area with a small particle diameter to support a larger amount of liquid and can be easily obtained. Organic powder is not preferable in that it adversely affects the hardening properties of the dry blend containing a hydraulic composition.

In the present invention, the ratio ((X)/(Y)) of the total amount (X) of the liquid composition containing the anionic aromatic compound and the cationic surfactant to the total amount (Y) of the inorganic powder is preferably 1/99 to 60/40, more preferably 5/95 to 50/50, even more preferably 10/90 to 40/60, from the viewpoint of powderization.

From the viewpoint of powderization of the anionic aromatic compound or the cationic surfactant, it is preferable in consideration of the specific surface area of the inorganic powder that when the specific surface area is 1500000 cm$^2$/g to more than 500000 cm$^2$/g, (X)/(Y) is preferably 1/99 to 60/40; when the, specific surface area is 500000 cm$^2$/g to more than 100000 cm$^2$/g, (X)/(Y) is preferably 1/99 to 20/80; when the specific surface area is 100000 cm$^2$/g to more than 30000 cm$^2$/g, (X)/(Y) is preferably 1/99 to 10/90; when the specific surface area is 30000 cm$^2$/g to more than 10000 cm$^2$/g, (X)/(Y) is preferably 1/99 to 5/95; and when the specific surface area is 10000 cm$^2$/g to 5000 cm$^2$/g, (X)/(Y) is preferably 1/99 to 3/97.

To obtain the powder with higher contents of the active ingredients, the concentration of the liquid composition is preferably higher in such a range as to enable production of the powder.

The liquid composition (aqueous solution or the like) containing the anionic aromatic compound and/or the cationic surfactant used in the rheology modifier can be powdered by the powderization method according to the present invention. The cationic surfactant is preferably obtained usually as a liquid composition, and thus the powderization according to the present invention is useful for it. That is, at least one of the anionic aromatic compound and the cationic surfactant is mixed in liquid form, for example in the form of a liquid composition (aqueous solution or the like).

Preferably, the liquid composition (aqueous solution or the like) containing the anionic aromatic compound and/or the liquid composition (aqueous solution or the like) containing the cationic surfactant is powdered by mixing it with the inorganic powder having a specific surface area of 5000 cm$^2$/g or more. A mixing machine used in mixing these components includes powder mixers such as a V-type mixer, a ribbon mixer, a NAUTA mixer and a super mixer, among which a super mixer is preferable for obtaining a uniform powder.

As one example of the method of mixing for powderization, the inorganic powder having a specific surface area of 5000 cm$^2$/g or more is introduced into a super mixer (300 L, manufactured by Olympia Kakoki Co., Ltd.) and then stirred at 100 to 500 rpm, while predetermined amounts of the composition containing the anionic aromatic compound and the composition containing the cationic surfactant are downward sprinkled onto, and mixed with, the inorganic powder. At least one of the composition containing the anionic aromatic compound and the composition containing the cationic surfactant is a liquid composition (aqueous solution or the like). As the stirring condition of the mixer, the circumferential velocity is preferably 150 to 1500 m/min., more preferably 150 to 1200 m/min., even more preferably 150 to 900 m/min., from the viewpoint of attaining powder uniformity and of suppressing heat evolution. The time for sprinkling the liquid composition at the time of mixing is preferably 5 to 30 minutes, more preferably 5 to 20 minutes, even more preferably 5 to 15 minutes, from the viewpoint of attaining powder uniformity and of suppressing heat evolution. It is even more preferable that the inorganic powder having a specific surface area of 5000 cm$^2$/g or more and the liquid composition containing the cationic surfactant are mixed with each other and then mixed with the powdery anionic aromatic compound.

When only one of the liquid composition (aqueous solution or the like) containing the anionic aromatic compound and the liquid composition (aqueous solution or the like) containing the cationic surfactant is sprinkled, the other component is used in powdery form, and the other component (powdery form), a defoaming agent (powdery form) etc. can be added to, and mixed with, the resulting powdered material to give the powdery rheology modifier of the present invention.

The powdered rheology modifier of the present invention can be used as an ingredient to be incorporated into a previously prepared mortar material (dry blend) containing a hydraulic material, aggregate, fine particles etc. For mixing the ingredient in obtaining the dry blend, the above-mentioned mixer, preferably the super mixer, can be used. The dry blend can be applied to external and internal walls of an architecture, base mortar, spray mortar, injectable material, repairing material and self-leveling material.

In the rheology modifier of the present invention, the anionic aromatic compound is contained preferably in an amount of 0.1 to 30 parts by weight (in terms of active ingredient), more preferably 1 to 10 parts by weight and even more preferably 1 to 7 parts by weight, and the cationic surfactant is contained preferably in an amount of 0.1 to 30 parts by weight (in terms of active ingredient), more preferably 1 to 10 parts by weight and even more preferably 1 to 7 parts by weight, based on 100 parts by weight of the inorganic powder having a specific surface area of 5000 $cm^2/g$ or more.

The rheology modifier of the invention can be preferably applied to a hydraulic composition being a slurry containing a hydraulic powder. The rheology modifier of the invention can be preferably included in a hydraulic composition being a slurry containing a hydraulic powder. That is, the invention is a hydraulic composition obtained by adding the rheology modifier of the invention to a slurry containing a hydraulic powder.

The rheology modifier of the present invention can be applied preferably to slurry having a water powder weight ratio (water/powder) of 30/100 to 1000/100. The powder for production of this slurry can be in a hydraulic composition using as powder-a hydraulic substance having physical properties by which it is hardened by hydration reaction. Examples include cement and gypsum. Fillers can also be used, and examples of such fillers include calcium carbonate, fly ash, blast-furnace slag, silica fume, bentonite, and clay (natural mineral based on hydrated aluminum silicate; kaolinite, hallosite etc). These may be used alone or as a mixture thereof. Fillers not adversely affecting the physical properties of the objective slurry are preferably used as the inorganic powder for the rheology modifier of the present invention. If necessary, sand, gravel and a mixture thereof may be added as aggregate to the powder. It can also be applied to slurry of inorganic oxide-based powder such as titanium oxide or to soil.

In the rheology modifier of the present invention, the effective concentration of the anionic aromatic compound and the cationic surfactant in slurry may be determined suitably depending on the intended degree of thickening, and slurry containing the modifier of the present invention is obtained by a method of adding the rheology modifier of the present invention to previously prepared slurry or at the time of preparing slurry. The total effective concentration of the anionic aromatic compound and the cationic surfactant, in terms of effective concentration in an aqueous phase of the slurry, is preferably 0.01 to 20% by weight, more preferably 0.1 to 15% by weight, even more preferably 0.1 to 10% by weight, further more preferably 0.3 to 10% by weight.

A hydraulic composition containing the rheology modifier of the present invention may contain a dispersant. The dispersant includes water reducing agents such as a lignin sulfonic acid salt and derivatives thereof, oxycarboxylates, and polyol derivatives, high-performance water reducing agents and high-performance AE water reducing agents such as naphthalene-based agent (Mighty 150 manufactured by Kao Corporation), melamine-based agent (Mighty 150V-2 manufactured by Kao Corporation), polycarboxylic acid-based agents (Mighty 3000 manufactured by Kao Corporation; Rheobuild SP manufactured by NMB; Aquarock FC600, Aquarock FC900 manufactured by Nippon Shokubai Co., Ltd.), and phosphate-based agents, and anionic surfactants such as polycarboxylic acid based-surfactants (Poise series manufactured by Kao Corporation). Among these, polycarboxylic acid-based high-performance water reducing agents, phosphoric acid-based high-performance water reducing agents and polycarboxylic acid-based surfactants are preferable in that both the fluidity and viscosity of the slurry can be satisfied.

The content of the dispersant in the hydraulic composition containing the rheology modifier of the invention, in terms of the content of its active ingredient in the hydraulic powder, is generally in the range of 0.01 to 5% by weight, more preferably 0.05 to 3% by weight.

The rheology modifier of the present invention can be used in combination with other existing thickening agents. Examples of the other existing thickening agents include, for example, cellulose derivatives, polyacrylate-based polymers, polyethylene oxide, polyvinyl alcohol, rubber-based polysaccharides, microbial fermentation polysaccharides etc.

The rheology modifier of the present invention and a defoaming agent can be simultaneously used. For example, the amount of air in the hydraulic composition containing the rheology modifier can be regulated by simultaneously using the defoaming agent. The defoaming agent can be contained in the powder of the rheology modifier. The content of the defoaming agent can be arbitrarily regulated depending on applications. As the defoaming agent, tributyl phosphates, pluronic defoaming agents, silicone-based defoaming agents and acetylene glycol derivatives for example are used.

The hydraulic composition containing the rheology modifier of the present invention may contain other ingredients such as an AE agent, a retardant, a rapid strength agent, an accelerator, a bubbling agent, a foaming agent, a cracking reducing agent and a swelling-reducing agent insofar as the performance of the present agent is not hindered.

A hardened composition obtained by hardening a composition containing the rheology modifier of the present invention and a hydraulic powder is excellent in initial hardening physical properties. Aggregate can also be contained in a hydraulic composition containing the rheology modifier of the present invention. A hardened composition obtained by hardening this hydraulic composition is excellent in initial hardening physical properties and can be used preferably in structures etc.

The aggregate is not specifically limited, and fine aggregate or coarse aggregate can be used, and aggregate having high strength with a low percentage of water absorption is preferable. The coarse aggregate includes river, land, mountain, sea and lime grave, broken stone thereof, blast-furnace slag coarse aggregate, ferronickel slag coarse aggregate, (artificial and natural) lightweight coarse aggregate, and recycled coarse aggregate. The fine aggregate includes river, land, mountain, sea and lime grave, silica sand and broken stone thereof, blast-furnace slag fine aggregate, ferronickel slag fine aggregate, (artificial and natural) lightweight fine aggregate, and recycled fine aggregate.

From the anionic aromatic compound, the inorganic powder having a specific surface area of 5000 $cm^2/g$ or more, and the cationic surfactant, a rheology modifier kit including (A) a powdery composition containing the anionic aromatic compound and (B) a powdery composition containing the cationic surfactant and the inorganic powder having a specific surface area of 5000 $cm^2/g$ or more can be provided according to the present invention. The above-mentioned arbitrary components can be suitably incorporated into the powdery composition (A) and/or the powdery composition (B). The powdery rheology modifier of the present invention can be obtained from the rheology modifier kit.

EXAMPLES

The following, examples describe practice of the present invention. The Examples describe mere illustration of the present invention and are not intended to limit the present invention.

Example 1

40 kg silica fume (SF-CD, specific surface area 203350 cm²/g) was introduced into a 300-L super mixer (manufactured by Olympia Kakoki Co., Ltd.) and stirred at 200 rpm, while 7.1 kg aqueous solution of a cationic surfactant (alkyltrimethyl ammonium chloride (C16 alkyl/C18 alkyl equimolar mixture), effective concentration of 29% by weight) was introduced through a horticultural spray into the silica fume over 6 minutes. After introduction, the mixture was mixed for 1 minute, and 1.4 kg sodium p-toluenesulfonate powder as an anionic aromatic compound and 0.2 kg defoaming agent (silicone-based defoaming agent based on dimethyl polysiloxane) were introduced into it and mixed at 200 rpm for 2 minutes. After mixing, the mixture was passed through a vibrating screen of 1-mm mesh size to give a powdery rheology modifier.

Additional powdery rheology modifiers were produced from the inorganic powder shown in Table 1 in the same manner as in Example 1. However, the amount of the cationic surfactant aqueous solution was made constant, and the amount of the inorganic powder was regulated to change the cationic surfactant aqueous solution (X)/inorganic powder (Y) weight ratio as shown in Table 1.

To the resulting powdery rheology modifier, "1 point" was given when the modifier was in dry powdery form, "2 points" were given when the modifier was in wet powdery form, and "3 points" were given when the modifier was wet particles having a diameter of 2 mm or more. The results are shown in Table 1. In Table 1, "–" indicates that the corresponding modifier was not examined.

specific surface area 203350 cm²/g) was used as the inorganic powder, and the cationic surfactant aqueous solution (X)/inorganic powder (Y) ratio by weight was changed into 15/85. This powdery rheology modifier was used to evaluate rheological properties of slurry.

400 g normal Portland cement (manufactured by TAIHEIYO CEMENT CORPORATION) and the powdery rheology modifier in the amount shown in Table 2 were dry-blended, and 400 g tap water was added thereto and stirred for 60 seconds with a hand mixer to prepare slurry. The amount of the powdery rheology modifier added was calculated based on the amount of water. The slurry test was carried out at room temperature (23° C.), and the temperature of water for kneading was regulated such that the slurry temperature became 20° C.

The slurry viscosity was measured with Viscotester VT-04E (manufactured by RION Co., Ltd.) with rotor No. 1 at a revolution number of 62.5 rpm at a temperature of 20° C. The amount of air was calculated from the viscosity of the kneaded slurry. The results are shown in Table 2.

TABLE 2

| Amount of modifier added (wt %*[1]) | Slurry viscosity (mPa · s) | Amount of air in slurry (vol %) |
|---|---|---|
| 0 | 300 or less | 0 |
| 6.7 | 1900 | 4.8 |
| 10.0 | 4100 | 3.6 |
| 13.4 | 5000 | 3.5 |

*[1]Weight-% based on water

TABLE 1

| | Inorganic powder | | Cationic surfactant aqueous solution(X)/inorganic powder(Y) ratio by weight | | | | | | | | |
|---|---|---|---|---|---|---|---|---|---|---|---|
| Kind | Specific surface area (cm²/g) | | 2.5/97.5 | 5/95 | 10/90 | 15/85 | 20/80 | 25/75 | 50/50 | 60/40 | 70/30 |
| Silica fume (1) [SF-CD, made in China] | 203350 | | 1 point | 1 point | 1 point | 1 point | 1 point | 3 points | — | — | — |
| Silica fume (2) [SF silica fume made in China] | 40944 | | 1 point | 1 point | 1 point | 3 points | — | — | — | — | — |
| Silica fume (3) [manufactured by EFACO Ltd., Egypt] | 223130 | | 1 point | 1 point | 1 point | 1 point | 1 point | 3 points | — | — | — |
| Fine powder of blast-furnace slag | 19210 | | 1 point | 2 points | 3 points | — | — | — | — | — | — |
| Calcium carbonate | 7730 | | 2 points | 3 points | — | — | — | — | — | — | — |
| Calcium silicate [Flowlight manufactured by Tokuyama Corporation] | 1300000 | | 1 point | 1 point | 1 point | 1 point | 1 point | 1 point | 1 point | 2 points | 3 points |

The results in Table 1 reveal that as the specific surface area of the inorganic powder is increased in powderization of the rheology modifier, the amount of the aqueous solution of the cationic surfactant for obtaining the dried powdery modifier can be increased and the concentration of the effective ingredient in the resulting powdery rheology modifier can be further increased.

Example 2

A powdery rheology modifier was prepared in the same manner as in Example 1 except that silica fume (SF-CD, As can be seen from Table 2, the slurry can be endowed with viscosity by adding the rheology modifier of the present invention to the slurry.

Example 3

Powdery rheology modifiers were prepared in the same manner as in Example 1 except that silica fume (SF-CD, specific surface area 203350 cm²/g) was used as the inorganic powder, the cationic surfactant aqueous solution (X)/inorganic powder (Y) ratio by weight was changed into 15/85, and the defoaming agent was added in the amounts shown in Table 3. The amount of the defoaming agent added was calculated based on the powdery rheology modifier. Each of the powdery rheology modifiers was used to evaluate rheological properties of slurry in the same manner as in Example 2. The powdery rheology modifier was added in a constant amount of 13.4% by weight based on water. The results are shown in Table 3.

TABLE 3

| Amount of modifier added (wt %*1) | Amount of the defoaming agent added (wt %*2) | Slurry viscosity (mPa · s) | Amount of air in slurry (vol %) |
|---|---|---|---|
| 13.4 | 0 | 5500 | 4.4 |
| 13.4 | 0.019 | 4800 | 3.2 |
| 13.4 | 0.094 | 4500 | 1.5 |
| 13.4 | 0.188 | 4400 | 1.1 |
| 13.4 | 0.375 | 4400 | 0.6 |
| 13.4 | 0.75 | 4400 | 0.3 |
| 13.4 | 1.50 | 4000 | 0 |

*1Weight % based on water
*2Weight % based on the powdery rheology modifier

As can be seen from Table 3, the amount of air in the slurry can be regulated by regulating the amount of the defoaming agent contained in the rheology modifier of the present invention.

The invention claimed is:

1. A powdery rheology modifier, comprising an anionic aromatic compound having a weight-average molecular weight of less than 500, a cationic surfactant and an inorganic powder having a specific surface area of 40944 $cm^2/g$ or more, wherein the cationic surfactant is supported on the inorganic powder.

2. The powdery rheology modifier according to claim 1, wherein the inorganic powder is silica fume.

3. The powdery rheology modifier according to claim 1, wherein the specific surface area of the inorganic powder is 1500000 $cm^2/g$ or less.

4. A rheology modifier kit, comprising (A) a powdery composition comprising an anionic aromatic compound having a weight-average molecular weight of less than 500 and (B) a powdery composition comprising a cationic surfactant and an inorganic powder having a specific surface area of 40944 5000 $cm^2/g$ or more wherein the cationic surfactant is supported on the inorganic powder.

5. A hydraulic composition, obtained by adding the rheology modifier according to any of claims 1 to 3 to a slurry containing a hydraulic powder.

6. A process for producing a powdery rheology modifier, comprising a step of mixing an inorganic powder having a specific surface area of 40944 $cm^2/g$ or more, an anionic aromatic compound having a weight-average molecular weight of less than 500, and a cationic surfactant, wherein at least one of the anionic aromatic compound and the cationic surfactant is mixed in liquid form and the cationic surfactant is supported on the inorganic powder.

7. The process for producing a powdery rheology modifier according to claim 6, which comprises mixing an inorganic powder having a specific surface area of 40944 $cm^2/g$ or more with a liquid composition comprising a cationic surfactant and then mixing a powdery anionic aromatic compound therewith.

8. The powdery theology modifier according to claim 1, wherein the cationic surfactant having at least one saturated or unsaturated linear or branched alkyl group having 10 to 26 carbon atoms.

9. The powdery theology modifier according to claim 1, wherein the anionic aromatic compound comprising of at least one selected from the group consisting of salicylic acid, p-toluenesulfonic acid, sulfosalicylic acid, benzoic acid, m-sulfobenzoic acid, p-sulfobenzoic acid, 4-sulfophthalic acid, 5-sulfoisophthalic acid, p-phenotsulfonic acid, m-xylene-4-sulfonic acid, cumenesulfonic acid, methylsalicylic acid, styrenesulfonic acid and chlorobenzoic acid or their salt.

* * * * *